United States Patent

Rutulis et al.

[15] 3,646,463

[45] Feb. 29, 1972

[54] GAIN STABILIZED PARAMETRIC DEVICE

[72] Inventors: Uldis Rutulis; Edward Stowe Layton, both of Ottawa, Ontario, Canada

[73] Assignee: Northern Electric Company Limited, Montreal, Quebec, Canada

[22] Filed: Nov. 2, 1970

[21] Appl. No.: 85,842

[52] U.S. Cl. ................................330/4.9, 307/88.3, 330/127

[51] Int. Cl. ..........................................................H03f 7/04

[58] Field of Search ..................................330/4.9; 307/88.3

[56] References Cited

UNITED STATES PATENTS 3,388,263 6/1968 Daniel ...................................330/4.9

*Primary Examiner*—Roy Lake
*Assistant Examiner*—Darwin R. Hostetter
*Attorney*—John E. Mowle

[57] ABSTRACT

A gain stabilized parametric device having a varactor diode shunted by an external bias resistor to form a self-bias configuration. When pump, input, or pump and input signals are coupled to the varactor diode, through pump and signal circuits respectively, a self-bias voltage develops across the bias resistor. This self-bias voltage is compared to a preset reference voltage to generate a difference voltage which is then amplified and used to control the attenuation of a variable attenuator interposed between the pump source and the pump circuit.

3 Claims, 1 Drawing Figure

PATENTED FEB 29 1972 3,646,463
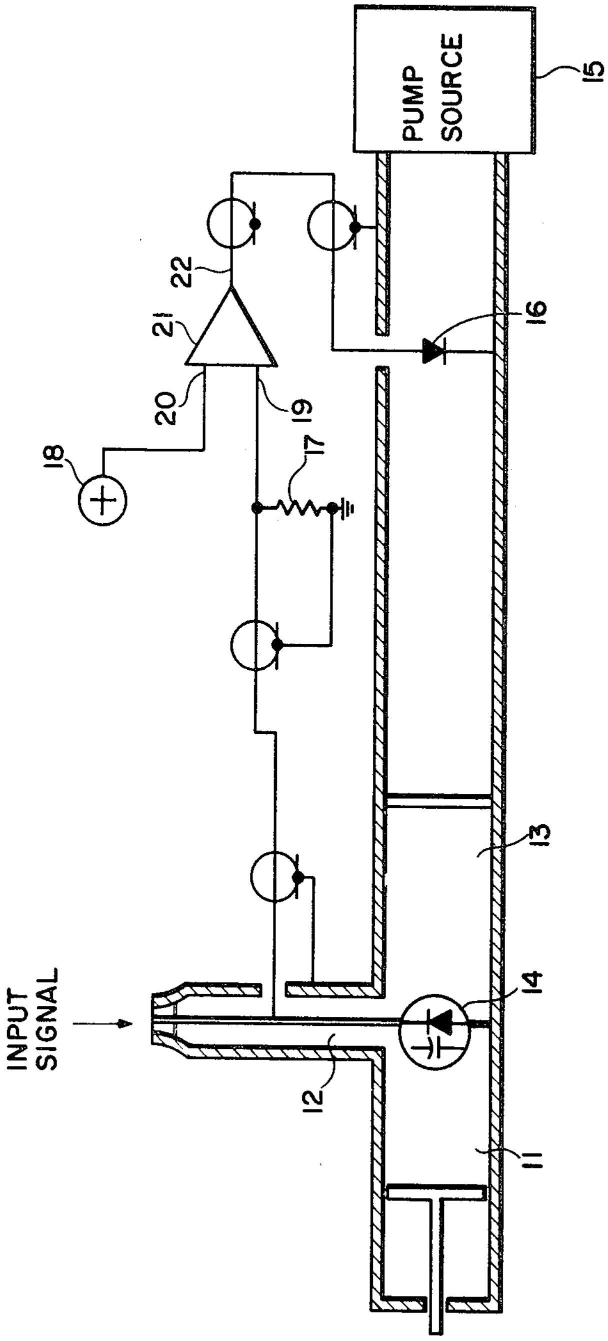
INVENTORS
ULDIS RUTULIS
EDWARD S. LAYTON
BY John E. Moule

GAIN STABILIZED PARAMETRIC DEVICE

FIELD OF THE INVENTION

This invention relates to parametric devices such as parametric amplifiers, upconverters, downconverters and frequency multipliers using varactor diodes, and more particularly to a gain stabilized parametric device which uses a self-biased varactor diode.

DESCRIPTION OF THE PRIOR ART

It is highly desirable in many applications to stabilize the gain of a parametric device such as a parametric amplifier against changes due to ambient conditions and aging. The gain of a parametric amplifier is controlled primarily by the pump power coupled to the junction of the varactor diode. Accordingly, it has been common practice to achieve an order of gain stability by controlling the pump power by controlling the environment of the parametric amplifier and pump source. If, for example, both the pump and amplifier are enclosed in a controlled low-temperature environment using a cryogenic refrigeration system, not only is the gain stability of the parametric amplifier improved, but the noise figure is reduced as well. Alternately a controlled heating system may be used to stabilize the ambient temperature of the pump and amplifier if a higher noise figure can be tolerated.

Although both cooled and heated enclosures have proved beneficial in stabilizing the gain of parametric amplifiers the heavy power requirement, cost and the relatively long temperature stabilizing periods have limited the use of envIronmental control. Furthermore, as a controlled environment cannot compensate for aging of the pump source, the gain of a parametric amplifier even under controlled conditions will decrease slowly with the passage of time.

An alternate approach to gain stabilizing a parametric amplifier involves sampling and detecting the power entering the parametric amplifier from the pump source with a directional coupler. After detection of the sampled power, the resulting voltage level is compared to a preset reference voltage by a comparator amplifier whose output is used to control a variable attenuator interposed between the varactor diode and the pump source. This approach stabilizes the power entering the parametric amplifier, as it compensates for ambient changes as well as aging of the pump source, by regulating the pump power entering the parametric amplifier at the pump circuit. Although the above method has proven advantageous, two primary drawbacks remain: (1) a very stable detector is required, and (2) the detector samples only the pump power entering the parametric amplifier from the pump circuit and not the total power coupled to the varactor diode from the signal and pump circuits.

Parametric amplifiers using varactor diodes may be either fixed or self-biased. One example of a fixed biased parametric amplifier may be found in U.S. Pat. No. 3,195,062 issued on July 13, 1965 to Tomomi Murakami.

The bias voltage developed across the junction of a self-biased pumped varactor diode is substantially constant for a given level of pump power under normal operation. In the self-biased mode, the bias voltage at the operating point is determined primarily by the value of resistance externally connected across the varactor diode in conjunction with the applied pump power. Parametric amplifiers which use self-biased varactor diodes generally tend to break into oscillation when subjected to large signal or pump power spikes. These oscillations, which generally persist even after the cause has been removed, usually require that the pump power be temporarily reduced before normal stable operation can be restored. When a parametric amplifier breaks into oscillation, however, the level of this bias voltage increases significantly. Accordingly, a self-biased parametric amplifier may be stabilized against breaking into oscillation by using a clamping circuit to limit the bias voltage rise across the varactor diode to a value slightly higher than the normal operation bias voltage level. Although such a clamping circuit can safeguard a parametric amplifier against breaking into oscillation it cannot stabilize the gain against ambient changes and pump power variations.

SUMMARY OF THE INVENTION

It has been found that the bias voltage developed across a pumped varactor diode remains constant in spite of bias resistance changes due to ambient conditions when a parametric device is operating at constant gain. Thus, the gain of a parametric device may be held at a constant level by controlling the pump power coupled to the varactor diode in a manner which will maintain the bias voltage developed across the varactor diode at a predetermined level.

This knowledge of bias voltage variation of self-biased varactor diodes can be used to advantage by sampling the voltage developed across a pumped varactor diode and using this voltage in a feedback loop to control the pump power incident on the varactor diodes. By incorporating a parametric device in a closed loop control system, the gain of the parametric device may be kept constant over a wide range of environmental conditions and variations in pump power as long as the available pump power is above a preset minimum. Normal operation will also be quickly restored after large signal or pump power spikes without having to temporarily reduce the pump power.

Thus, in accordance with the present invention, a parametric device comprises a signal circuit, a pump circuit, and an idler circuit, all of which are coupled to a varactor diode. A pump source is coupled to the pump circuit through a variable attenuator. A bias resistor is connected in shunt with the varactor diode to support a bias voltage developed across the varactor diode by the power levels coupled to the varactor diode from the input and pump signals. The bias voltage developed across the bias resistor is compared to a reference voltage to obtain a difference voltage which is amplified to obtain a control voltage. This control voltage is used to control the attenuation of the variable attenuator thereby controlling the pump power coupled to the varactor diode. As the varactor diode self bias voltage is determined by the total power (pump + signal) coupled to the varactor diode, regulating the self-bias voltage will serve to regulate the total power coupled to the varactor diode and consequently the gain of the parametric device.

BRIEF DESCRIPTION OF THE DRAWINGS

An example of one embodiment of the invention will now be described with reference to the accompanying drawing of a gain stabilized parametric amplifier in accordance with the present invention.

DESCRIPTION OF THE PREFERRED EMBODIMENT

In the example embodiment, portions of the parametric amplifier are illustrated in simplified cross section. It will be understood however, that this is only exemplary of the many types of parametric devices to which the present invention is applicable.

Referring to the single FIGURE, the gain stabilized parametric amplifier comprises a waveguide idler circuit 11, a coaxial signal circuit 12, and a waveguide pump circuit 13 each coupled to a varactor diode 14. A pump source 15 is connected to the pump circuit 13 through a section of waveguide having a variable attenuator 16, which is a PIN-diode (P-type, INTRINSIC, N-type). A bias resistor 17 is connected in shunt with the varactor diode 14 to support a reverse bias voltage developed across the varactor diode 14. The reverse bias voltage developed across the bias resistor 17, and a positive preset direct current reference voltage 18, are connected to inputs 19 and 20 respectively of a direct current comparator amplifier 21. The output 22 of the direct current comparator amplifier 21 is connected across the PIN-diode attenuator 16.

In operation an input signal at signal frequency, and a pump signal at pump frequency are coupled to the varactor diode 14 through the signal 12 and the pump 13 circuits respectively. The input and pump signals develop an idler signal in the idler circuit 11 which is tuned to a frequency equal to the difference between the pump and signal frequencies.

The varactor diode 14 is shunted by an external resistor 17 to form a self-bias configuration. The combination of input and pump signals coupled to the varactor diode 14 develops the reverse bias voltage across the varactor diode 14 and its shunting bias resistor 17 as a result of rectification in the diode 14.

This reverse bias voltage is connected to the input 19 of the direct current comparator amplifier 21 while the preset positive direct current reference voltage 18 is connected to the input 20 of said amplifier. The difference between the positive direct current reference voltage 18 and the reverse bias voltage is amplified by the direct current comparator amplifier 21 to generate a control voltage at the output 22. The control voltage is connected to the PIN-diode attenuator 16 interposed between the pump source 15 and the pump circuit 13, in order to control the level of pump power coupled to the varactor diode 14 from the pump circuit 13.

As the gain of the parametric amplifier is proportional to the total power coupled to the varactor diode 14 (input and pump), and as the reverse bias voltage developed across the varactor diode 14 is proportional to this total power, regulating this reverse bias voltage by varying the pump power portion of the total power effectively stabilizes the gain of the parametric amplifier.

While the example embodiment is illustrated as a parametric amplifier, the invention is equally applicable to other parametric devices such as upconverters, downconverters and frequency multipliers utilizing varactor diodes as their active elements.

What is claimed is:

1. In a parametric device comprising a signal circuit, a pump circuit, an idler circuit tuned to the difference frequency produced by the interaction of signals from said signal circuit and said pump circuit, a pump source, a variable attenuator coupled between the pump source and the pump circuit, and a varactor diode coupling said circuits, the improvement comprising:
   a bias resistor connected in shunt with the varactor diode to support a bias voltage developed across said varactor diode from said signals at the varactor diode, means for comparing a reference voltage and the bias voltage, to obtain a control voltage proportional to a difference between said reference and bias voltages, said control voltage controlling the attenuation of said variable attenuator for regulating the total power coupled to the varactor diode so as to stabilize the gain of the parametric device.

2. The parametric device as claimed in claim 1 wherein the variable attenuator is a PIN-diode.

3. The invention as claimed in claims 1 and 2 wherein the reference voltage is a direct current voltage.

* * * * *